(12) United States Patent
Blankenship et al.

(10) Patent No.: US 7,183,516 B2
(45) Date of Patent: Feb. 27, 2007

(54) SYSTEM AND METHOD FOR WELDING WITH MULTIPLE ARCS

(75) Inventors: George D. Blankenship, Chardon, OH (US); Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 204 days.

(21) Appl. No.: 10/852,088

(22) Filed: May 24, 2004

(65) Prior Publication Data

US 2005/0269305 A1 Dec. 8, 2005

(51) Int. Cl.
*B23K 9/10* (2006.01)
(52) U.S. Cl. ............................. 219/130.31; 219/130.1; 219/130.32
(58) Field of Classification Search ............. 219/130.1, 219/130.31, 130.32, 130.33, 130.51, 137 PS
See application file for complete search history.

(56) References Cited

U.S. PATENT DOCUMENTS

| | | | |
|---|---|---|---|
| 967,578 A * | 8/1910 | Siemund ................ | 219/130.32 |
| 1,619,629 A * | 3/1927 | Owen ..................... | 219/130.1 |
| 2,417,907 A | 3/1947 | Bowen, Jr. et al. | |
| 2,655,586 A | 10/1953 | Schreinr et al. | |
| 2,673,915 A | 3/1954 | Steinert et al. | |
| 2,837,627 A | 6/1958 | Soulary | |
| 3,566,072 A | 2/1971 | Pierce | |
| 3,774,011 A | 11/1973 | Aldenhoff | |
| 3,911,243 A * | 10/1975 | Moriyama et al. ....... | 219/130.1 |
| 4,117,304 A | 9/1978 | Wodzinski et al. | |
| 4,553,018 A * | 11/1985 | Kondo et al. .......... | 219/130.51 |
| 6,051,810 A | 4/2000 | Stava | |
| 6,111,216 A | 8/2000 | Stava | |
| 6,207,929 B1 | 3/2001 | Stava | |
| 6,362,986 B1 | 3/2002 | Schultz et al. | |

FOREIGN PATENT DOCUMENTS

| | | |
|---|---|---|
| EP | 0 538 227 A | 4/1993 |
| EP | 1 600 238 A | 11/2005 |
| GB | 282 527 A | 12/1927 |
| GB | 282527 | 12/1927 |
| GB | 554687 | 7/1943 |
| JP | 62214873 | 9/1987 |
| SU | 460957 A * | 4/1975 ............. 219/130.1 |

OTHER PUBLICATIONS

European Search Report, EP 05 00 3471, Munich, Sep. 19, 2005, De Backer, T.
European Search Report, EP 05 01 1923 Munich, Mar. 22, 2006, Jeggy, T.

* cited by examiner

*Primary Examiner*—Clifford C. Shaw
(74) *Attorney, Agent, or Firm*—Fay, Sharpe, Fagan, Minnich & McKee, LLP

(57) ABSTRACT

A system and method for welding with a first and second arc between a first and second electrode, respectively, and a common workpiece, where each of the electrodes is driven by a single power source, where there is a first inductor connected in series with the first electrode and a second inductor connected in series with the second electrode and each of the inductors has sufficient inductive reactance to store enough energy to maintain an existing arc associated with one of the electrodes for a selected general time with essentially no current to the one electrode.

86 Claims, 6 Drawing Sheets

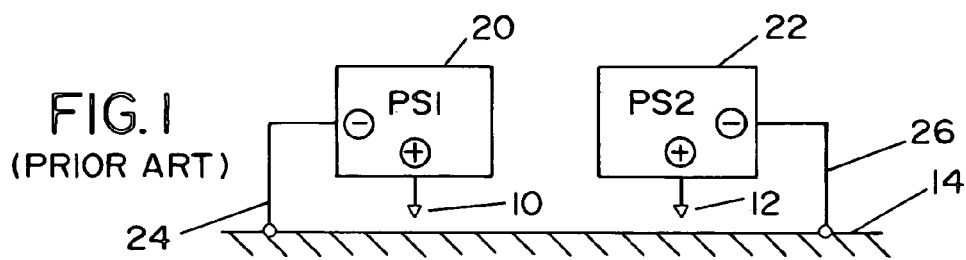
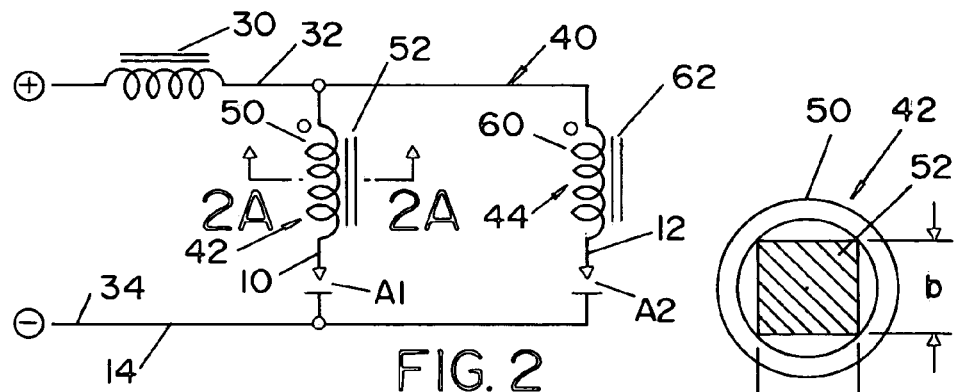
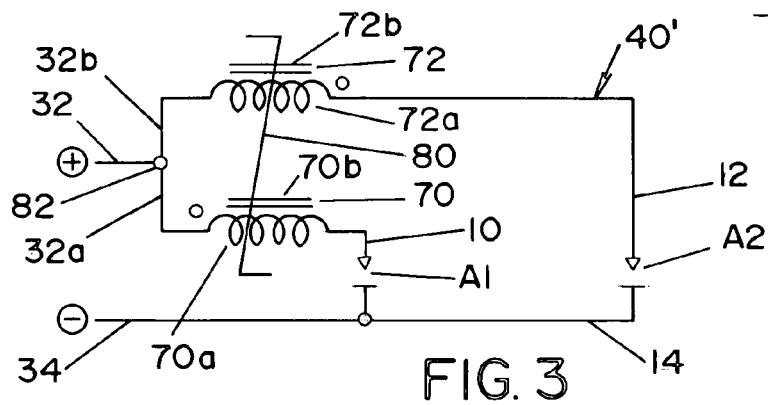
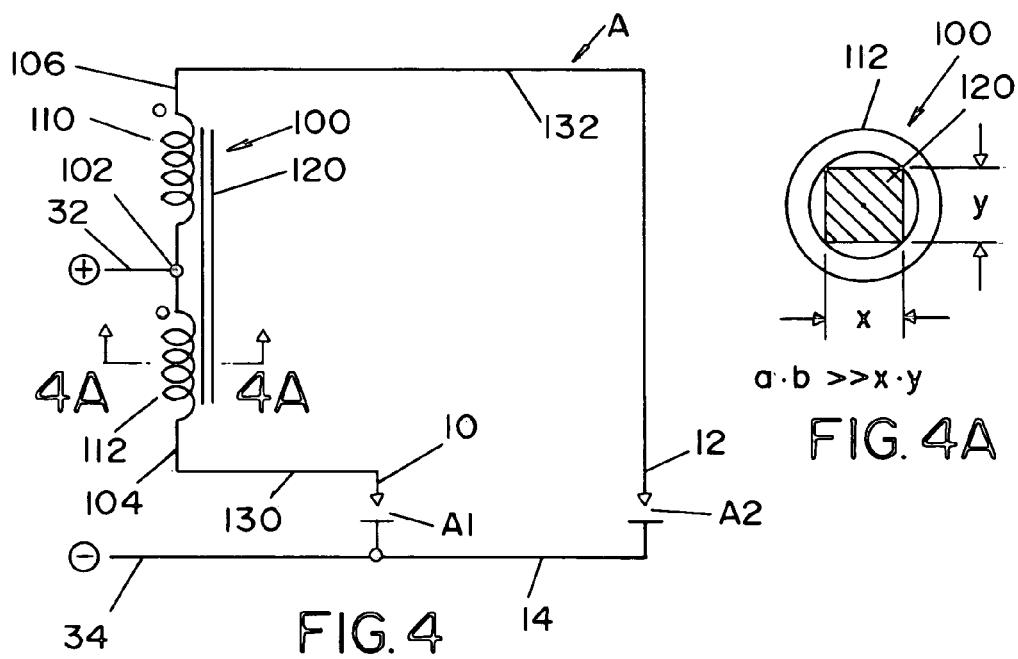

SYSTEM AND METHOD FOR WELDING WITH MULTIPLE ARCS

The present invention relates to the field of electric arc welding and more particularly to a system and method for DC or AC welding with multiple arcs.

INCORPORATION BY REFERENCE

Electric arc welding of pipe sections generally involves an automatic welding operation wherein two or more electrodes are moved in unison along a path in the space between the two pipe sections, hereinafter referred to as the workpiece. The first electrode is melted to lay a bead that fills the root gap between the pipe sections. Subsequent electrodes are melted and deposit molten metal in successive layers to fill the gap between the pipe sections and, thus, finalize the welded pipe joint. The use of multiple electrodes to create multiple arcs in an automatic welding operation involves the use of a separate power source for each of the electrodes arranged in tandem and moved in unison. This well known technology is contained in several patents, such as Stava U.S. Pat. No. 6,207,929 incorporated by reference herein as background information. By using individual power sources to drive the arc between each electrode and the workpiece, each arc is independently controlled by its dedicated power source. The present invention relates to a system using a center tapped choke, which is a component often used by The Lincoln Electric Company of Cleveland, Ohio and disclosed in several patents such as Stava U.S. Pat. No. 6,051,810 incorporated by reference herein as background information. The two Stava patents show existing technology to which the present invention is directed and a component used in the preferred embodiment of the present invention. Consequently, there is no need to discuss the details of the prior art tandem operated electrodes or the details of a center tapped choke.

BACKGROUND OF INVENTION

When using multiple arcs, such as an automatic welding process having tandem arranged electrodes, it has become common practice to use a separate power source for each electrode used to create an arc for the welding process. Such system and method is expensive and involves substantial space and weight, especially when the power sources must be moved around a pipe during the welding operation. To reduce the cost and weight for automatic welding with two or more arcs, a single power source has been suggested where a choke mounted interior of the power source limits the amount of current flow, especially when one of the arcs is inadvertently shorted. This solves the excessive current problem; however, there is a more basic problem. When there is a short circuit of one arc, all current from the power source to the choke is directed to the electrode that is short circuited. Consequently, the arc or arcs associated with the other electrodes are extinguished and must be restarted when the short circuit is cleared. To alleviate this problem, often the tandem electrode arrangement is operated in a spray mode to minimize inadvertent short circuits and, thus, eliminates the problem of a short circuit in one arc extinguishing the other arcs. This solution to the problem drastically reduces the versatility of the welding operation using tandem electrodes or an automatic welding process.

STATEMENT OF INVENTION

The present invention involves a system and method of arc welding with multiple arcs, where the process need not be limited to spray welding, but a short circuit of one arc does not extinguish the other arcs in a grouping of tandem arranged electrodes. In accordance with the invention, there is provided a system for welding with a first and second arc between a first and second electrode, respectively, and a workpiece common to all electrodes. The common workpiece can be spaced sections of pipe being joined by melting the first and second electrodes in sequence as they are moved in unison. In this system, the electrodes are driven by a single power source and a first inductor is connected in series with the first electrode and a second inductor is connected in series with the second electrode. The inductors may include a single section or several inductors and have a sufficient inductive reactance to store enough energy to maintain an existing arc associated with one of the electrodes for a selected general time with essentially no current to this one electrode. In this manner, when one electrode is short circuited to the workpiece, the other arc or arcs are sustained for a period of time determined by the inductive reactance of the inductor or inductors in series with each electrode. The preferred arc sustaining time is in the general range of 1.0 ms to 10 ms and is preferably in the general range of 4.0–6.0 ms. In accordance with another aspect of the present invention, the inductor for the separate arcs is wound on a single or common core in the form of a center tapped choke of the type generally shown in Stava U.S. Pat. No. 6,051,810.

In accordance with another aspect of the present invention, each electrode is in series with one or more inductors where the inductors are each sections of a center tapped choke. By using more than one center tapped choke several inductors can be driven by a single power source with the series inductors on one or more center tapped chokes arranged in a tree pattern.

In accordance with still a further aspect of the present invention, an additional arc is provided between an additional electrode and a workpiece. This additional electrode is driven by the same power source and has an arc sustaining inductor in series with the additional electrode. In other words, several electrodes are mounted in tandem and operated by a single power source with an inductive reactance in series with each electrode to maintain an arc when one of the other electrodes is short circuited.

In accordance with another aspect of the invention, there is provided a method for arc welding with at least two separate electrodes forming arcs with a given workpiece, which workpiece may be the ends of pipe sections. This method comprises moving the electrodes in unison relative to the workpiece in a welding path, applying current to the electrodes from a single power source and inserting an inductive reactance in series with each of the inductors to maintain an arc for a given time when reduced current is applied from the source to any one of the electrodes, such as when there is a short circuit between one of the electrodes and the workpiece. Another aspect of the method is that the welding current is provided by an inverter and the current is created by a series of current pulses generated at a rate greater than about 18 kHz. This process is preferably an automatic welding process so the electrodes are moved in unison and the welding current is either DC current or AC current.

To minimize the inconsistent weld caused by one arc short circuiting and thereby extinguishing another arc, the present invention provides an inductor, in the form of one or more sections, in series with each of the arcs. These inductor sections are wound on cores with the proper core material, air gap, cross sectional area and conductor turns, such that the inductive reactance in series with each arc stores enough energy to maintain the arc at the end of the electrode to which the inductor section or sections are connected. The inductors are sized to provide enough energy to maintain an arc for a period of approximately 1.0–10.0 ms and preferably about 4.0–6.0 ms. This time is based upon the normal short circuit time experienced in welding processes, wherein the short circuit generally lasts for less than 5.0 ms. The individual inductors in parallel with the electrodes are sized to accommodate a variety of short circuiting times. The term "inductor" means one or more coil sections in series.

The concept of individual inductors or inductive reactances in series with each arc is further simplified by utilizing, in accordance with the preferred embodiment, a center tapped inductor sometimes referred to as a "choke." The power source is connected to the center tap and each winding of the inductor is connected to an arc or a subsequent center tapped inductor or choke to insert one or more inductors in series with each arc. When a center tapped choke is used with each coil section directed to the same number of arcs, such as one arc, current flow through the center tap and through one winding to one or a given number of arcs tends to cause the flux in the core to be minimized. As current flows through the center tap and through the opposite windings or coils, the flux in the core is cancelled. This flux cancelling effect is a reason for preferring the use of a center tapped choke, instead of separate chokes or inductors. By using a center tapped choke and a balanced number of arcs, the core stays nearly balanced during normal operation with a like current through each coil section. Consequently, a smaller core is required for a center tapped choke as compared to the invention using merely individual inductors having their own separate cores.

The present invention is used for MIG, TIG, pulse welding, AC welding and submerged arc welding. It is less beneficial for spray welding since the occurrence of individual short circuits is somewhat rare. In accordance with an aspect of the invention, a feedback current or feedback voltage is used to control the power source. In current feedback operations, a shunt is placed in series with the conductor attached to the center tap and a signal is fed back to the power source control circuit to maintain the desired current flowing through the center tapped inductor. When using a constant voltage or a voltage feedback control, the voltage between the inductor center tap and the work is fed back to the power source control circuit to maintain constant voltage. In these feedback circuits, the voltage and current is sensed prior to the arc sustaining inductors used in the present invention. Consequently, the inductors can be mounted as a network remote to the power source. They are thereby adjacent the electrodes so less inductive reactance is caused by the power leads to the individual electrodes.

The primary object of the present invention is the provision of a system and method, which system and method uses an inductive reactance in series with each electrode of a multiple arc welding operation so short circuiting of one arc will not immediately extinguish the other arcs.

Another object of the present invention is the provision of a system and method, as defined above, which system and method can be easily used on a standard power source for driving a series of electrodes moved in unison in an automatic welding process.

Still a further object of the present invention is the provision of a system and method, as defined above, which system and method allows the use of a single power source for a welding process involving two or more parallel arcs.

Still a further object of the present invention is the provision of a system and method, as defined above, which system and method can be used in a variety of welding processes and with both DC and AC welding currents.

These and other objects and advantages will become from the following description taken together with the accompanying drawings.

BRIEF DESCRIPTION OF DRAWINGS

FIG. 1 is a wiring diagram schematically illustrating a prior art system to which the present invention is directed;

FIG. 2 is a wiring diagram illustrating the broad aspect of the present invention;

FIG. 2A is an enlarged cross-sectional view taken generally along line 2A—2A of FIG. 2;

FIG. 3 is a wiring diagram illustrating the embodiment of the present invention shown in FIG. 2 with separate cores for the inductors with the cores transformer coupled with each other;

FIG. 4 is a wiring diagram of the preferred embodiment of the present invention utilizing a center tapped choke;

FIG. 4A is an enlarged cross-sectional view taken generally along line 4A—4A of FIG. 4;

PREFERRED EMBODIMENT

Figure 5:
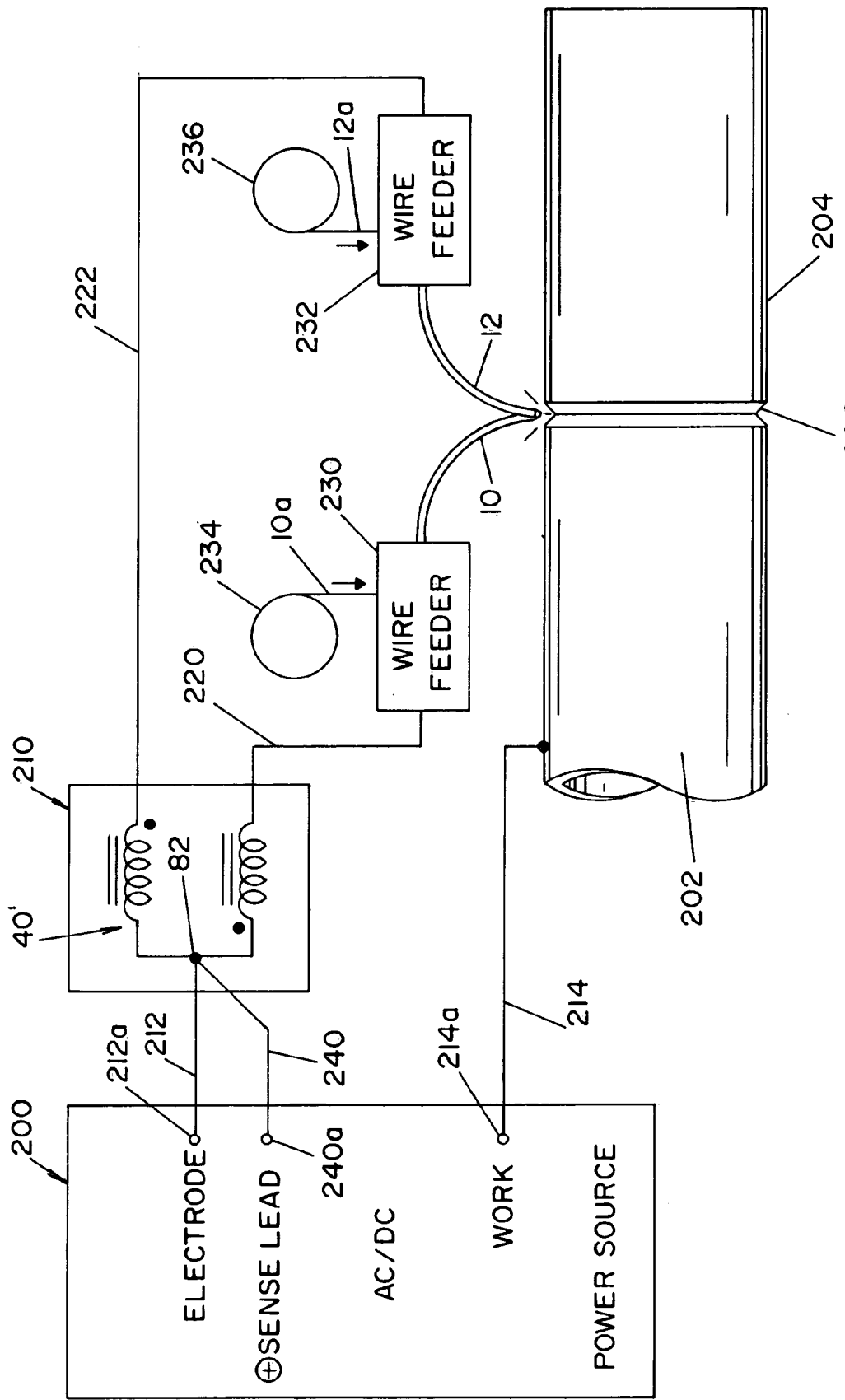
FIG. 5 is a pictorial and schematic view illustrating a field application of the preferred embodiment of the present invention for pipe welding.

In Stava U.S. Pat. No. 6,207,929 two tandem arranged electrodes move in unison and are driven by separate power sources. Such system is schematically illustrated as prior art in FIG. 1 where tandem electrodes 10, 12 create parallel arcs with workpiece 14 and are connected to a first power source 20 and a second power source 22, respectively. Leads 24, 26 connect the power sources to the workpiece, which can be the two spaced ends of pipe sections. The present invention involves a welding process using at least two electrodes, such as electrodes 10 and 12, driven by a single power source. In the past, a system using a single power source for multiple arcs often included a choke 30 as shown in FIG. 2. This choke was connected to the parallel arcs of inductors 10 and 12 to limit current when one of the electrodes 10, 12 was shorted. However, the common choke did not prevent an arc from being extinguished when one of the arcs was shorted. Consequently, a short circuit caused disruption in the weld process and complex restarting techniques. To solve this problem, the present invention is illustrated in FIG. 2 wherein the single power source represented by output terminals 32, 34 is connected by circuit 40 to electrodes 10, 12. Individual inductors or series inductors 42, 44 have inductive reactances controlled by the core material, air gap, cross-sectional area and conductor turns. The inductive reactance of inductors 42, 44 is in series with arc A1 and arc A2. Thus, enough energy is stored in the inductors to maintain one of the arcs associated with one of the electrodes for selected time when essentially no current is directed to the electrode. This diversion of current occurs when one of the arcs is short circuited to workpiece 14. Circuit 40 constitutes the broadest aspect of the present invention. Inductors 42, 44 have inductive reactance to sustain an arc when the other arc is short circuited. In accordance with standard practice inductors or inductive reactances 42, 44 are provided with a coil 50, 60 and a center core 52, 62. These reactors are often referred to as a choke for use in limiting current flow during welding. In this invention the choke inductor, reactor, etc. is used to feed stored current to the arc or plasma when little current is available. As illustrated in FIG. 2A, the cross-sectional area of core 52 is the product of width a and height b. This cross-sectional area, together with the number of turns and the material of the core produces sufficient inductive reactance to maintain an arc for at least 10.0 ms and preferably in the general range of 4.0–6.0 ms. In the practical implementation of the present invention, the inductive reactance is such that the arc A1 or arc A2 is sustained for approximately 5.0 ms when the other arc is short circuited. Circuit 40 illustrates the broadest aspect of the present invention and sustains one of the arcs A1, A2 when the other is short circuited. A slight modification of the embodiment in FIG. 2 is illustrated in FIG. 3 where circuit 40' includes inductors 70, 72 have windings 70a, 72a and cores 70b and 72b. In accordance with this embodiment of the invention, the cores are transformer coupled to each other, as indicated by symbol 80. Thus, lead 32 is branched into leads 32a, 32b communicated with inductors 70, 72, respectively. By this embodiment the core flux caused by current flow through coils 70a, 72a is in opposite directions to cancel out during normal operation of circuit 40'. This modification of the broad concept shown in FIG. 2 provides an advantage better obtained in the preferred embodiment of the present invention as shown in FIG. 4.

Referring now to the preferred embodiment of the invention shown in FIG. 4, circuit A for electrodes 10, 12 includes a center tapped choke or inductor 100 having tap 102 connected to lead 32, end 104, end 106 and coils, or inductor sections, 110, 112 wound around a single core 120. The center tapped choke or inductor has output leads 130, 132 connected in series with electrodes 10, 12, respectively. Of course, the electrodes are normally welding wire, either cored or solid, provided from a reel and receiving welding current from leads 130, 132. In this embodiment, coils or inductor sections 110, 112 have the same number of turns so the flux in core 120 caused by the two spaced coils generally cancel each other. The size of core 120, as represented in FIG. 4A, is the product of width x and height y. By using a center tapped choke or inductor as in FIG. 4, instead of the individual inductors of FIG. 2, the size of core 120 (x.y) can be drastically less than the size of core 52 (a.b). In practice, the use of a center tap inductor allows reduction of the core at least 50% from the cross-section of core 52. This reduction in the core size to obtain the same arc sustaining energy is an advantage of using a center tapped choke over merely individual inductors. The ability to use a center tapped choke is an advantage of the invention broadly illustrated in FIG. 2 and precisely implemented in FIG. 4. In operation, a short circuit at arc A1 or at arc A2 will not extinguish the opposite arc. The inductive reactance of the portion of choke 100 in series with the specific electrode 10, 12 sustains the non-shorted arc. The present invention is illustrated with two parallel arcs; however, the invention is applicable to use of additional arcs. Thus, the invention is broadly defined as first and second arcs, which description incorporates any number of multiple arcs driven by a single power source.

A practical implementation of the present invention is illustrated in FIG. 5 wherein power source 200 is used to weld together pipe sections 202, 204 having a separating groove 206 to be welded and filled by electrodes 10, 12 driven by a single power source 200. The electrodes are moved in unison and automatically around groove 206 so that molten metal from electrodes 10 and 12, is directed into groove 206. Metal from the two electrodes welds sections 202, 204 together. The arc sustaining inductors or inductance reactance devices are located in inductor network 210. This network is shown as circuit 40' in FIG. 3, but it can be like circuit 40 of FIG. 2 or circuit A of FIG. 4. Remote inductor network 210 has input lead 212 from power source 200. The lead is connected to terminal 212a. Terminal 214a is connected to output lead 214 forming an electrical connection with the workpiece comprising spaced pipe sections 202, 240. Network 210 is constructed in accordance with the present invention and has output leads 220, 222 for directing either AC or DC welding current to parallel electrodes 10, 12 to perform an automatic welding operation as the electrodes are moved in unison. Wire feeders 230, 232 pull electrode wire 10a, 12a, respectively, from supply reels or spools 234, 236, respectively. In accordance with standard control technology a voltage sensing lead 240 at junction 82 of circuit 40' directs the voltage of network 210 back to terminal 240a of power source 200 for the purpose of maintaining the proper welding voltage. This practical implementation of the present invention is the intended use of circuit 40, circuit 40' or circuit A as so far described. Each electrode is provided with an inductive reactance in series with a single power source to maintain an arc at the electrode, irrespective of the momentary short circuiting of another arc. Of course, more than two electrodes in tandem are often employed in pipe welding. The present invention is applicable to such systems as will be described and shown in further embodiments. All embodiments are applicable to the pipe welding process shown in FIG. 5.

Figure 6:
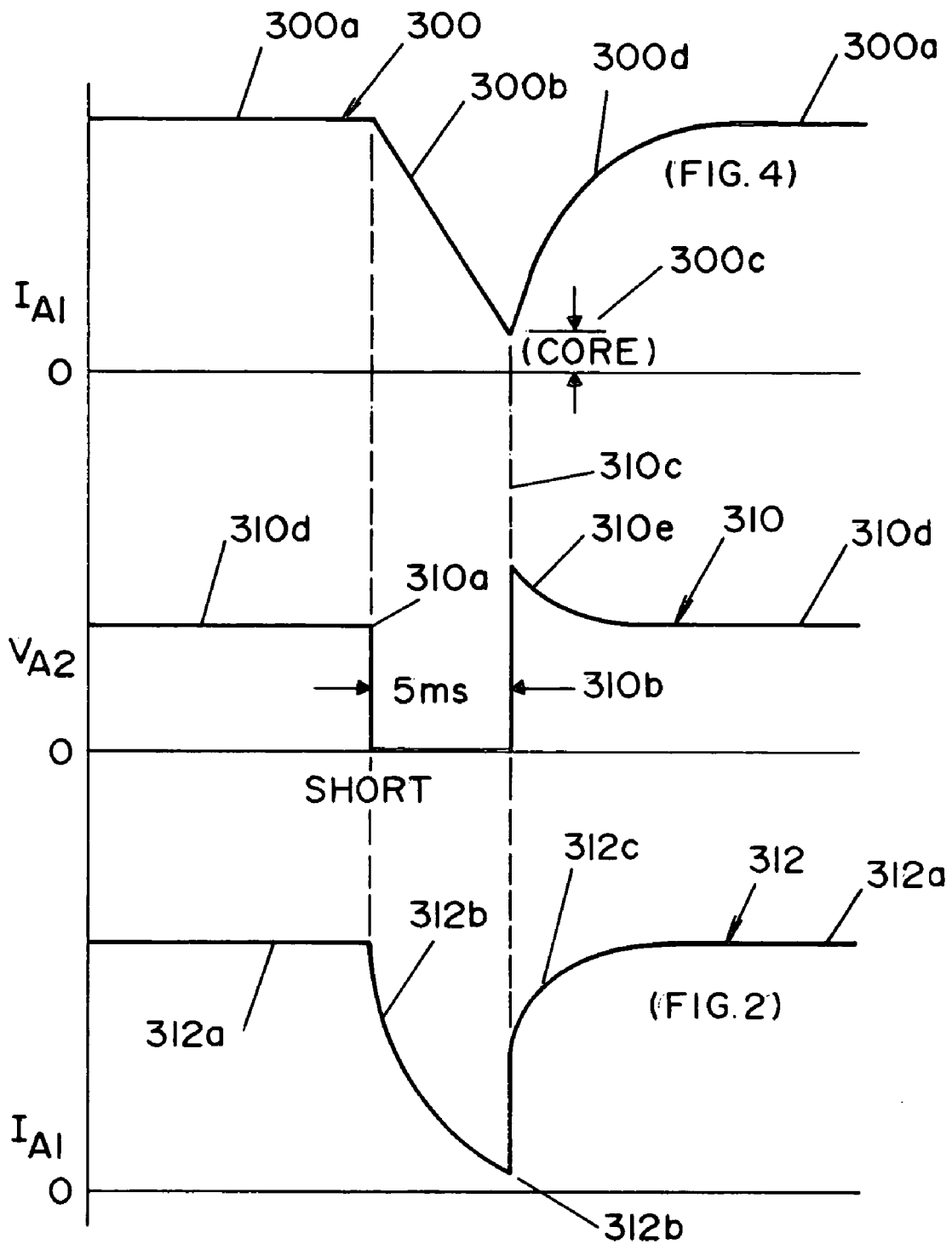
FIG. 6 is a series of curves showing the voltage and current associated with embodiments of the invention shown in FIGS. 2 and 4.

Curves 300, 310 and 312 shown in FIG. 6 represent the voltage and current of the electrodes employing the present invention as shown broadly in FIG. 2 and in the preferred embodiment of FIG. 4. Curve 310 is the voltage across an arc that is shorted. The arc is indicated to be arc A2. Voltage 310d plunges to near zero at short circuit point 310a and remains low for a time 310b, which time is normally about 5.0 ms. The short circuit is cleared as indicated by point 310c by a standard routine that raises the arc current across the electrode to cause the short to neck and separate. The common short clearing circuit is not a part of the invention and is a well known feature of many welders. In summary, there is a short circuit at point 310a and the short circuit is cleared at point 310c. The voltage level 310d is the controlled voltage level during the welding operation. Spike 310e is the recovery spike occurring when the short circuit breaks abruptly to reestablish arc A2. Curve 300 is the current curve the non-shorted arc A1 using circuit A of FIG. 4. At point 310a, high current is drawn by arc A2. This action reduces the current available for arc A1 so the current through the arc reduces in the straight line slope 300b until it reaches the lower level 300c, when the short circuit is removed. At that time, the current across A1 recovers along time constant curve 300d. The inductive reactance of core 120 in FIG. 4 controls the slope of line 300b and point or level 300c of current curve 300. This inductive reactance also controls the shape of line 300d. When the two arc sustaining inductors are wound on separate cores, as shown in FIG. 2, then the current of non-short circuited arc 1 is shown as curve 312. The current has an operating level 312a and is reduced along a time constant curve 312b when there is a short circuit of arc A2. When the short is removed, current 312 recovers rapidly and then along a time constant curve 312c. In both instances, there is a certain amount of energy remaining to maintain arc A1 when arc A2 is short circuited. In the embodiment shown in FIG. 2, the current drops to a level 312b, which level is lower than level or point 300c. The lower current level is due to the lack of mutual coupling between the cores of the individual inductors. The curves shown in FIG. 6 illustrate the operating characteristics of the broad aspect of the present invention and the preferred embodiment of the invention as shown in FIG. 4 when center tapped coil or choke 100 is used to control two arcs, A1, A2.

Figure 8:
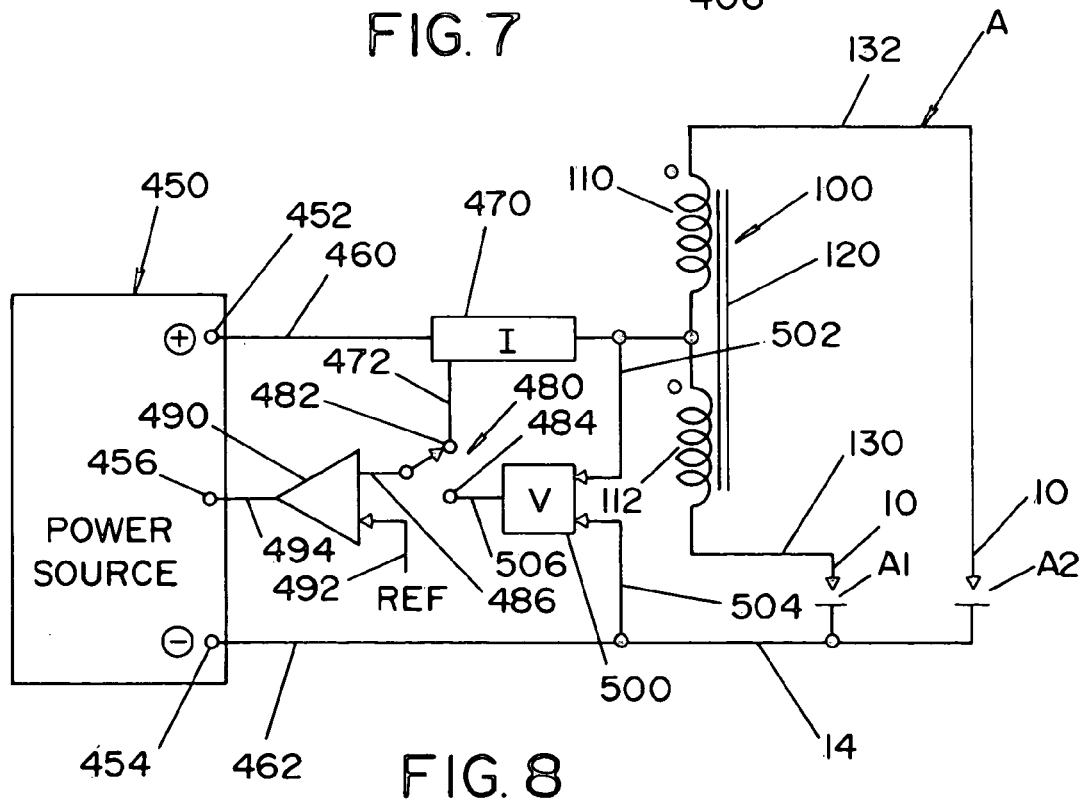
FIG. 8 is a combined wiring diagram and diagram of the preferred embodiment of the present invention with an appropriate voltage and current control.

The invention involves the use of an inductive reactance in series with the parallel arcs driven by a single power source. The embodiment shown in FIG. 4 is preferred and includes circuit A for controlling two arcs, A1, A2. An addition to circuit A is illustrated in FIG. 8 wherein circuit 400 controls three parallel arcs A3, A4 and A5 between the ends of electrodes 400, 402 and 404 and workpiece 406. As illustrated in FIG. 4, circuit 400 includes center tapped choke or coil 100 having output leads 130, 132. To control a further parallel arc, circuit 400 includes a second center tapped choke 410 having a center tap 412 and ends 414, 416. Coils or inductor sections 420, 422 are wound as indicated by the polarity dot on single core 430 to produce output on leads 440, 442 connected to electrodes 400, 402, respectively. The operation of the three electrodes 400, 402 and 404 is the same as the operation of electrodes 10, 12 in FIG. 4. However, the inductive reactance in series with electrode 404 includes the inductive reactance of coil 110. The inductive reactance in series with inductor 400 includes coil 112 and coil 420. In a like manner, the inductive reactance in series with electrode 402 is the inductive reactance of coil 112 and coil 422. Consequently, the coils of the center tapped choke 100, 410 being equal, there is a higher inductive reactance in series with arc A3, A4 than there is in series with arc A5. However, the short circuit of any arc will not activate the available energy in the coils to maintain plasma in the non-shorted arcs. The use of more than one coil section is still referred to as an inductor in series with the arc. As will be explained later, any number of parallel arcs with series inductive reactance can be used to practice the present invention.

As explained in the practical implementation of the present invention, the inductive reactance elements are remotely located as indicated by network 210 in FIG. 5. When remotely located, feedback controls can be provided conveniently. This advantage is illustrated in FIG. 8 where circuit A of FIG. 4 is connected to single power source 450 having output terminals 452, 454 and a feedback control terminal 456. Choke 100 is mounted remotely from power source 450 and is connected to the power source by output leads 460, 462 which are the leads forming the feedback control components, one of which is shunt 470 having an output line 472 with a signal representative of the arc current. This line is connected to selector switch 480 having current pin 482 and a voltage pin 484 selectively connected to output 486 forming one input of error amplifier 490. The other input 492 is a reference value for either the feedback current or feedback voltage so output 494 of error amplifier 490 has a level which is directed to control terminal 456. This provides a control loop with current or voltage feedback. The voltage loop uses sensor 500 having inputs 502, 504 across leads 460, 462, respectively. This sensor measures the welding voltage to create a signal representative of weld voltage on output lead 506 connected to voltage pin 484 of selector switch 482. With the switch in the position shown in FIG. 8, a current feedback loop is established for controlling power source 450. By shifting switch 480 to pin 484, welding voltage is used to control the output voltage of power source 450. Of course, switch 480 is normally digital, although is illustrated as being analog. Both control loops can be used in unison to control the power source. The power source is a standard apparatus; however, in the preferred embodiment it is controlled by waveform technology pioneered by The Lincoln Electric Company of Cleveland, Ohio. In this type of power source, a high speed switching inverter has a waveform controlled by a signal to a pulse width modulator operated at a frequency exceeding 18 kHz. The output of the pulse width modulator controls the wave shape or parameter across terminals 552, 554. Thus, the inverter is operated by a waveform generator having a control input connected to terminal 456. This is standard technology in the welding industry.

Figure 7:
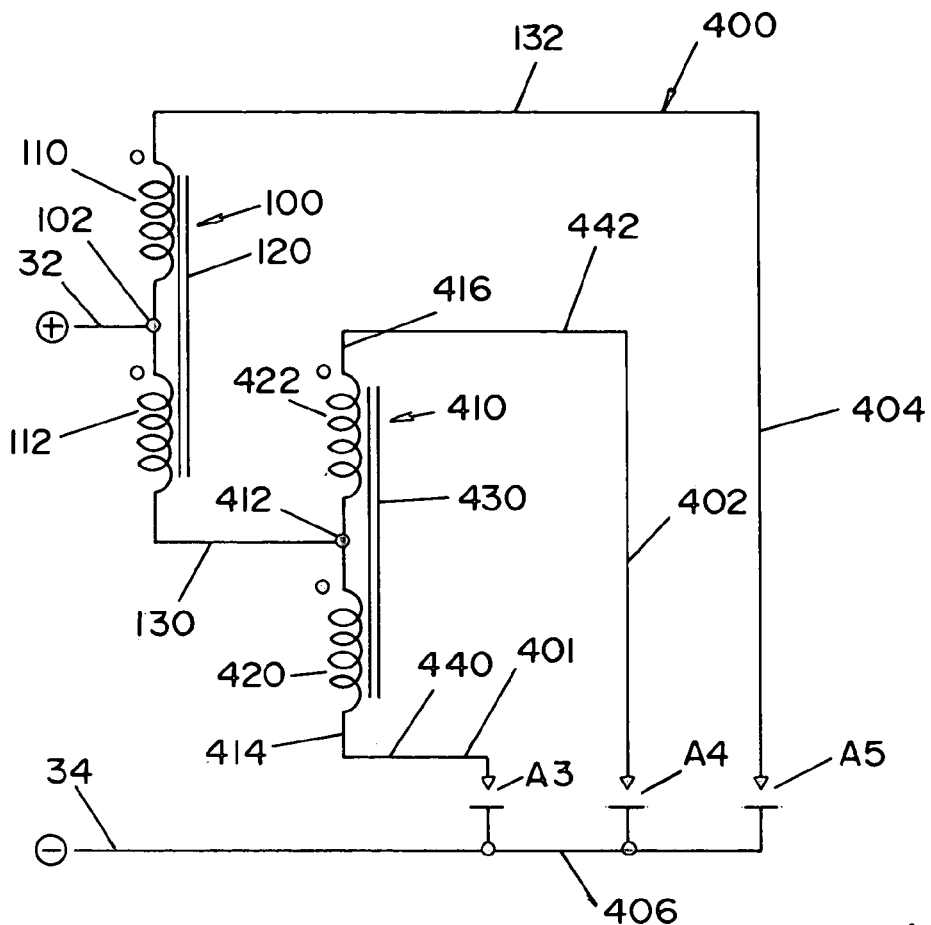
FIG. 7 is a wiring diagram illustrating the present invention used for three parallel arcs.
Figure 9:
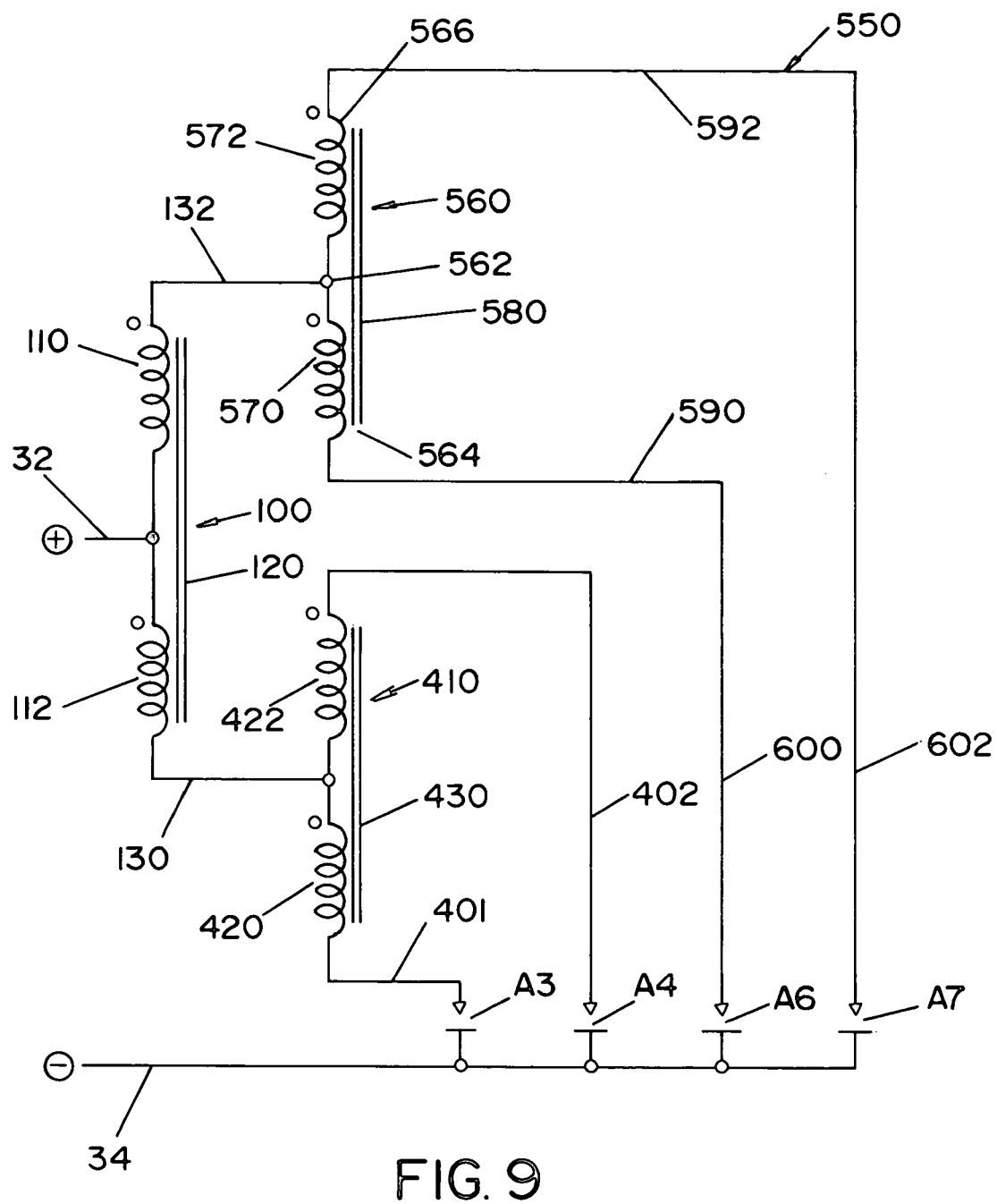
FIG. 9 is a wiring diagram of the use of the present invention for more than two parallel arcs ad using three enter tapped chokes.

Four parallel arcs are controlled by circuit 550 shown in FIG. 9. Circuit 550 adds components to circuit 400 shown in FIG. 7. These additions are connected to output 132. A center tap choke 560 includes center tap 562 and ends 564 and 566 so coils or sections 570, 572 have output leads 590, 592. These leads are in series with electrodes 600, 602 for creating arcs A6, A7, respectively. Thus, circuit 550 includes three center tapped chokes. Preferably, the coils of all of these chokes are the same and the inductive reactance in series with electrodes 400, 402, 600 and 602 are essentially the same. The operation of the embodiment shown in FIG. 9 has been previously explained. A short in any arc A3, A4, A6 and A7 will not extinguish any of the other arcs.

Figure 10:
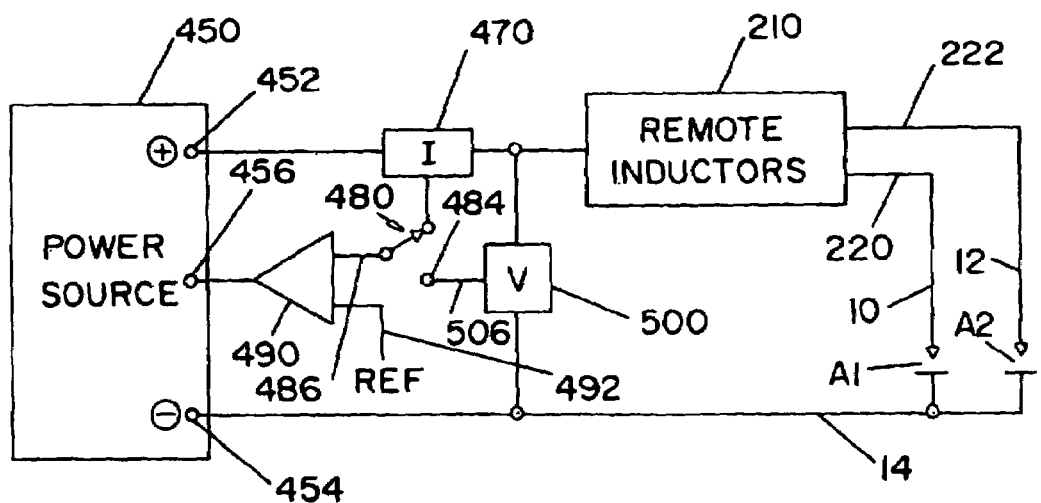
FIG. 10 is a view similar to FIG. 8 illustrating the arrangement of the control feedback loops used in accordance with the present invention.
Figure 11:
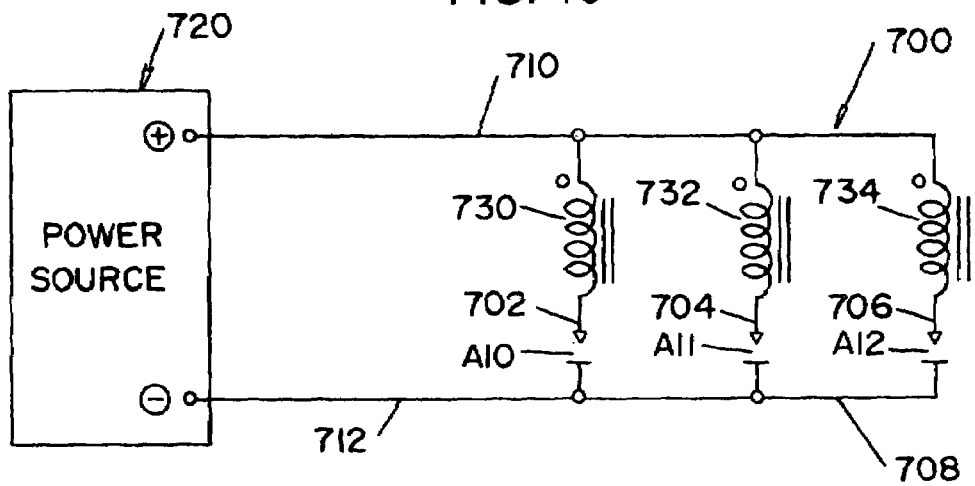
FIG. 11 is a wiring diagram of an embodiment of the present invention having three parallel arcs; and, FIG. 12 is a schematic layout drawing of an embodiment of the present invention using a single power source for multiple parallel arcs, illustrated as four parallel arcs.
Figure 12:
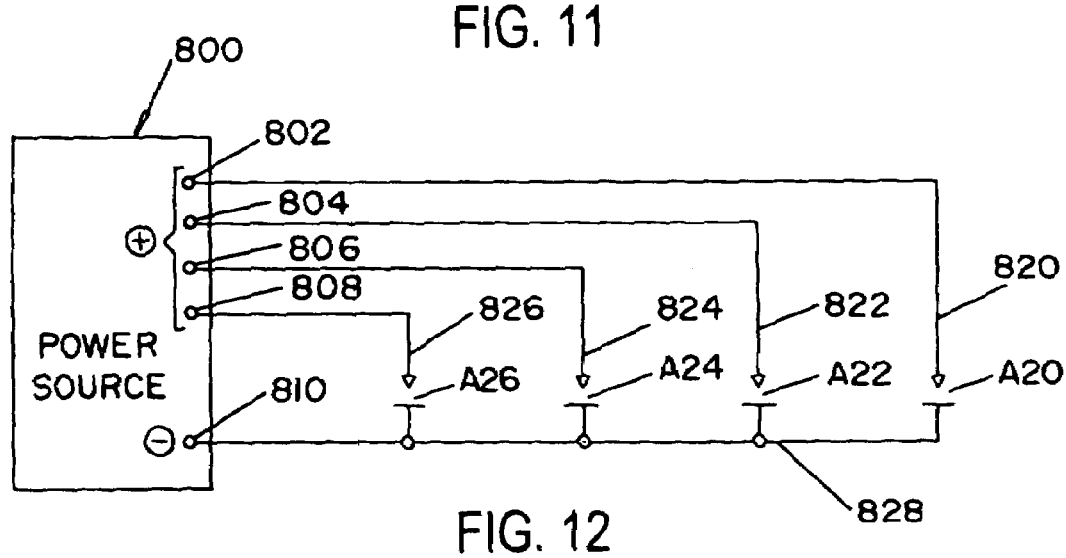

FIGS. 10–12 are illustrative of certain aspects of the invention. In FIG. 10, there is no detail of the actual inductor circuit used in network 210. This figure merely illustrates that the feedback control architecture of FIG. 8 can be incorporated in the preferred implementation of the invention as shown in FIG. 5 where circuit 40' is shown. The feedback control is allowed by the remote location of network 210, but it could be implemented after the power source if necessary. In FIG. 11, circuit 700 includes electrodes 702, 704 and 706 to create arcs A10, A11 and A12 with respect to workpiece 708. The arcs are in series with output leads 710, 712 of power source 720. Each of the inductors, any number of which could be used, are provided with individual inductors 730, 732 and 734, respectively. The inductors provide inductive reactance in series with the electrodes so that the inductive reactance in each series circuit is sufficient to store enough energy to maintain an existing arc associated with any of the electrodes for a selected general time with essentially no current to that electrode. The time is in the general range of 1.0 ms to 10.0 ms and preferably in the general range of 4.0 to 6.0 ms. Any number of arcs could be controlled by circuit 700. Turning now to FIG. 12, power source 800 has internal inductive control devices. These control devices are on the interior of the power source to control a plurality of output terminals 802, 804, 806 and 808. Any number of these terminals could be provided with appropriate internal networks having sufficient inductive reactance in series with these terminals and connected to leads 820, 822, 824 and 826. These leads provide current to establish parallel arcs A20, A22, A24 and A26 between the electrodes and workpiece 828 connected to terminal 810. Any number of parallel arcs can be provided by individual terminals at the output of power source 800 having internal circuitry for providing series inductive reactance to control current in the various electrodes. The series inductive reactance maintains current flow and are not to limit current flow. Limiting current flow is the normal function of a choke, such as choke 30 shown in FIG. 2.

Having thus defined the invention, the following is claimed:

1. A system for welding with a first and second arc between a first and second electrode, respectively, and a common workpiece, where each of said electrodes is driven by a single power source, said system comprising: a first inductor connected between said power source and said first electrode and a second inductor connected between said power source and said second electrode, where each of said inductors has sufficient inductive reactance to store enough energy to maintain an existing arc associated with one of said electrodes for a selected general time with essentially no current to said one electrode, said inductors being wound on a common core.

2. A system as defined in claim 1 wherein said time is in the general range of 1.0 ms to 10 ms.

3. A system as defined in claim 2 wherein said inductors each have a core with parameters to control said time.

4. A system as defined in claim 3 wherein each of said inductors has a winding containing substantially the same number of turns.

5. A system as defined in claim 3 wherein said inductors are mounted adjacent said power source.

6. A system as defined in claim 2 wherein a winding polarity of said inductors causes opposite flux in said common core.

7. A system as defined in claim 6 wherein each of said inductors has a winding containing substantially the same number of turns.

8. A system as defined in claim 6 wherein said inductors are mounted adjacent said power source.

9. A system as defined in claim 2 wherein each of said inductors has a winding containing substantially the same number of turns.

10. A system as defined in claim 2 wherein said inductors are located remote from said power source with a common power lead from said power source to said inductors.

11. A system as defined in claim 10 including a current device to sense current in said common power lead.

12. A system as defined in claim 11 including a current feedback loop to communicate a signal representative of said sensed current to said power source.

13. A system as defined in claim 12 including a voltage device to sense the voltage between said common power lead and a reference point at said power source.

14. A system as defined in claim 13 including a voltage feedback loop to communicate a signal representative of said voltage sensed by said voltage device to said power source.

15. A system as defined in claim 11 including a voltage device to sense the voltage between said common power lead and a reference point at said power source.

16. A system as defined in claim 15 including a voltage feedback loop to communicate a signal representative of said voltage sensed by said voltage device to said power source.

17. A system as defined in claim 10 including a voltage device to sense the voltage between said common power lead and a reference point at said power source.

18. A system as defined in claim 17 including a voltage feedback loop to communicate a signal representative of said voltage sensed by said voltage device to said power source.

19. A system as defined in claim 2 wherein said inductors are mounted adjacent said power source.

20. A system as defined in claim 2 including at least one additional arc between an additional electrode and said workpiece, said additional electrode also driven by said single power source and a current sustaining inductor in series with said additional electrode.

21. A system as defined in claim 20 wherein said current sustaining inductor in series with said additional electrode includes at least partially one of said first or second inductors.

22. A system as defined in claim 2 including an additional arc between an additional electrode and said workpiece, said additional electrode also driven by said single power source and at least one of said inductors being in series with said additional electrode.

23. A system as defined in claim 2 wherein at least one of said first and second inductors includes more than one coil.

24. A system as defined in claim 23 wherein both of said first and second inductors includes more than one coil.

25. A system as defined in claim 1 wherein said time is in the general range of 4.0–6.0 ms.

26. A system as defined in claim 25 wherein said inductors each have a core with parameters to control said time.

27. A system as defined in claim 26 wherein each of said inductors has a winding containing substantially the same number of turns.

28. A system as defined in claim 25 wherein a winding polarity of said inductors causes opposite flux in said common core.

29. A system as defined in claim 28 wherein each of said inductors has a winding containing substantially the same number of turns.

30. A system as defined in claim 25 wherein each of said inductors has a winding containing substantially the same number of turns.

31. A system as defined in claim 1 wherein said inductors each have a core with parameters to control said time.

32. A system as defined in claim 31 wherein each of said inductors has a winding containing substantially the same number of turns.

33. A system as defined in claim 31 wherein said inductors are mounted adjacent said power source.

34. A system as defined in claim 1 wherein a winding polarity of said inductors causes opposite flux in said common core.

35. A system as defined in claim 34 wherein each of said inductors has a winding containing substantially the same number of turns.

36. A system as defined in claim 34 including at least one additional arc between an additional electrode and said workpiece, said additional electrode also driven by said single power source and a current sustaining inductor in series with said additional electrode.

37. A system as defined in claim 36 wherein said current sustaining inductor in series with said additional electrode includes at least partially one of said first or second inductors.

38. A system as defined in claim 34 including an additional arc between an additional electrode and said workpiece, said additional electrode also driven.

39. A system as defined in claim 34 wherein at least one of said first and second inductors includes more than one coil.

40. A system as defined in claim 39 wherein both of said first and second inductors includes more than one coil.

41. A system as defined in claim 1 wherein each of said inductors has a winding containing substantially the same number of turns.

42. A system as defined in claim 41 wherein said inductors are mounted adjacent said power source.

43. A system as defined in claim 1 wherein said inductors are located remote from said power source with a common power lead from said power source to said inductors.

44. A system as defined in claim 43 including a current device to sense current in said common power lead.

45. A system as defined in claim 44 including a current feedback loop to communicate a signal representative of said sensed current to said power source.

46. A system as defined in claim 45 including a voltage device to sense the voltage between said common power lead and a reference point at said power source.

47. A system as defined in claim 46 including a voltage feedback loop to communicate a signal representative of said voltage sensed by said voltage device to said power source.

48. A system as defined in claim 43 including a voltage device to sense the voltage between said common power lead and a reference point at said power source.

49. A system as defined in claim 48 including a voltage feedback loop to communicate a signal representative of said voltage sensed by said voltage device to said power source.

50. A system as defined in claim 1 wherein said inductors are mounted adjacent said power source.

51. A system as defined in claim 1 including at least one additional arc between an additional electrode and said workpiece, said additional electrode also driven by said single power source and a current sustaining inductor in series with said additional electrode.

52. A system as defined in claim 51 wherein said current sustaining inductor in series with said additional electrode includes at least partially one of said first or second inductors.

53. A system as defined in claim 1 including an additional arc between an additional electrode and said workpiece, said additional electrode also driven by said single power source and at least one of said inductors being in series with said additional electrode.

54. A system as defined in claim 1 wherein at least one of said first and second inductors includes more than one coil.

55. A system as defined in claim 54 wherein both of said first and second inductors includes more than one coil.

56. A system for welding with a first and second arc between a first and second electrode, respectively, and a common workpiece, where each of said electrodes is driven by a power lead from a single power source, said system comprising: an inductor with a core, a center tap, a first end, a second end, a first coil section between said tap and said first end, and a second section between said tap and said second end, said power lead being connected to said tap, a first circuit connecting said first arc in series with said first coil and a second circuit connecting said second arc in series with said second coil.

57. A system as defined in claim 56 wherein coils each have an inductance to store enough energy to maintain an existing arc associated with one of said electrodes for a selected general time with essentially no current to said one electrode.

58. A system as defined in claim 57 wherein said time is in the general range of 1.0 ms to 10 ms.

59. A system as defined in claim 58 wherein said coils have substantially the same number of turns.

60. A system as defined in claim 57 wherein said coils have substantially the same number of turns.

61. A system as defined in claim 56 wherein said coils have substantially the same number of turns.

62. A system as defined in claim 61 including a second center tapped inductor with a center tap connected to said first end, a first coil in series with one of said first and second arcs and a second end connected to a third electrode for creating a third arc between said third electrode and said workpiece.

63. A system as defined in claim 56 including a second center tapped inductor with a center tap connected to said first end, a first coil in series with one of said first and second arcs and a second end connected to a third electrode for creating a third arc between said third electrode and said workpiece.

64. A system as defined in claim 63 including a third center tapped inductor with a center tap connected to said second end, a first coil in series with the other of said first and second arcs and a second end connected to a fourth electrode for creating a fourth arc between said fourth electrode and said workpiece.

65. A system as defined in claim 64 wherein said coils have substantially the same number of turns.

66. A system for welding with a first arc and a second arc between a first and second electrode, respectively, and a common workpiece, where said arcs are caused by current flow from a single power source, said system comprising: a first current sustaining inductor connected between said power source and said first electrode and a second current sustaining inductor connected between said power source and said second electrode whereby a short circuit of said first arc will not extinguish said second arc for at least a time greater than 1.0 ms said inductors being wound on a common core.

67. A system as defined in claim 66 wherein said time is in the general range of 1.0 ms to 10 ms.

68. A system as defined in claim 66 wherein said time is in the general range of 4.0–6.0 ms.

69. A system as defined in claim 66 wherein a winding polarity of said inductors causes opposite flux in said common core.

70. A system as defined in claim 66 wherein each of said inductors has a winding containing substantially the same number of turns.

71. A method for arc welding with at least two separate electrodes forming arcs with a given workpiece, said method comprising:
    (a) moving said electrodes in unison relative to said workpiece in a welding path;
    (b) applying current to said electrodes from a single power source; and,
    (c) inserting an inductor between said power source and each of said electrodes to maintain an arc for a given time when reduced current is applied from said source to any one of said electrodes, said inductors being wound on a common core.

72. A method as defined in claim 71 wherein said workpiece is an open root between two metal pieces.

73. A method as defined in claim 72 wherein said power source is a inverter and said current is created by a series of current pulses generated at a rate greater than about 18 kHz.

74. A method as defined in claim 73 wherein said arc welding is by an automatic process.

75. A method as defined in claim 74 wherein said arc welding current is an AC current.

76. A method as defined in claim 73 wherein said arc welding current is an AC current.

77. A method as defined in claim 72 wherein said arc welding is by an automatic process.

78. A method as defined in claim 77 wherein said arc welding current is an AC current.

79. A method as defined in claim 72 wherein said arc welding current is an AC current.

80. A method as defined in claim 71 wherein said power source is a inverter and said current is created by a series of current pulses generated at a rate greater than about 18 kHz.

81. A method as defined in claim 80 wherein said arc welding is by an automatic process.

82. A method as defined in claim 81 wherein said arc welding current is an AC current.

83. A method as defined in claim 80 wherein said arc welding current is an AC current.

84. A method as defined in claim 71 wherein said arc welding is by an automatic process.

85. A method as defined in claim 84 wherein said arc welding current is an AC current.

86. A method as defined in claim 71 wherein said arc welding current is an AC current.

* * * * *